United States Patent Office 3,488,273
Patented Jan. 6, 1970

3,488,273
ELECTRODEPOSITION METHOD FOR
DESIGN COATING
Olin B. Johnson, Livonia, Mich., assignor to Ford Motor
Company, Dearborn, Mich., a corporation of Delaware
Filed June 2, 1967, Ser. No. 643,129
Int. Cl. C23b 13/00; B01k 5/02
U.S. Cl. 204—181                                    13 Claims

ABSTRACT OF THE DISCLOSURE

The method of forming a design coating upon an electrically conductive workpiece which comprises directing a stream of an aqueous dispersion of an organic film-forming, coating material upon said workpiece from an electrode spaced from said workpiece, maintaining a difference of electrical potential between said electrode and said workpiece sufficient to effect electrodeposition of an essentially, water-insoluble coating of said organic coating material upon a predetermined portion of the surface of said workpiece in a predetermined design, applying a liquid, transparent coating of an organic, film-forming material to said workpiece covering the electrodeposited design, and subjecting the workpiece to paint polymerization conditions, the area of the workpiece to be coated by electrodeposition from said stream being predetermined by limiting the cross sectional area and configuration of said stream, predetermining the effective coating area within the area of stream contact with said workpiece by interadjusting the distance between said electrode and said workpiece, the difference of electrical potential between said electrode and said workpiece, and the electrical conductivity of said stream, and limiting the movement of said workpiece in relation to said stream.

BACKGROUND OF THE INVENTION

Electrodeposition of organic coating materials including rubber, wax, polytetrafluoroethylene, natural resins and certain synthetic polymers is well known in the art. More recently, with the development of specially tailored paint binder resins, the electrodeposition of paint has been disclosed in the literature and currently accounts for a significant volume of industrial painting. In this method of painting, a binder resin, with which pigments, organic or mineral filler, etc., may be incorporated, is dispersed in an aqueous coating bath with the aid of a dispersal assistant. In the main the resins employed for this purpose are polycarboxylic acid resins, i.e. organic resins having dissociable carboxyl groups in their molecular structure. These are dispersed in an aqueous bath with water soluble amines and are anodically depositable. The workpiece serves as one electrode and is immersed in the bath while a direct electric current is passed through the bath between the workpiece and another electrode. A number of such resins and the process above described is exemplified by U.S. Patent 3,230,162. The disclosures of this patent are incorporated herein by reference. Cathodically depositable resins are also known. These have ionizable groups in their molecular structure which exhibit positive sites upon dispersion in an aqueous bath.

Coating materials of the type hereinbefore and hereinafter described can be electrodeposited upon an electrically conductive workpiece without immersing the workpiece in the aqueous bath. This is effected by passing a stream of the dispersion in contact with an electrode and simultaneously in contact with the workpiece while providing a sufficient difference of electrical potential between the electrode and the workpiece to effect electrodeposition of coating material from the stream onto the workpiece.

BRIEF DESCRIPTION OF THE INVENTION

By controlling the configuration of a continuous aqueous stream of dispersed coating material between a first electrode and the workpiece, controlling the effective coating area within the area of contact of said stream with the workpiece by interadjusting and coordinating the distance between electrode and workpiece, the difference of electrical potential between electrode and workpiece, and the conductivity of the coating dispersion, and by controlling the movement of the workpiece in relation to the stream containing dispersed coating material, electrodeposition of a predetermined design can be effected upon an electrically conductive workpiece.

While the aqueous dispersion may spread over other surfaces of the workpiece, the coating will remain water-soluble outside the effective electrodeposition areas, i.e. those areas wherein current density is sufficient during contact of the stream with the workpiece to electrodeposit an essentially water-insoluble film. Hence, the workpiece can be rinsed to remove adhered coating material outside such areas without disturbing the electrodeposited design.

Employing a prearranged pattern of movement for workpiece in relation to the opposing electrode and/or by employing a predetermined number of small streams, a design pattern can be created upon the workpiece leaving unpainted areas between the painted areas. If desired, the unpainted areas can be coated in like manner with a paint of different color after the first deposit has been baked or otherwise polymerized. This second coating can be effected by immersing the workpiece in an electrodeposition bath and controlling the voltage and current density so as to limit coating to the areas previously not coated and the lightly coated areas, e.g. the perimeter areas of the earlier electrodeposition. This is made possible by the electrical resistance of the cured film of the initial design coating and the nature of the process which directs coating to the uncoated and lightly coated areas and confines coating to such areas so long as the electrical inducement to coating is insufficient to effect electrodeposition of the coating material over the previously cured initial deposit.

With the workpiece bearing a design coating and hence presenting a surface of varying height, a patterned design is effected by then covering the workpiece surface bearing such design with a transparent but colored paint, e.g. a paint that is tinted or lightly pigmented. Such a coating changes color tone with depth.

With the workpiece bearing a design coating of two or more colors, a patterned design is effected by then coating the surface with a transparent or substantially transparent paint utilizing the electrodeposited design in the same manner that underpainting is used in an artist's oil painting to create the desired tonal effect.

The topcoat may be applied by conventional paint application techniques, e.g. spray coating, flowcoating, roller coating, etc. The topcoat may also be electrodeposited over the design coatings after the latter have been cured by employing an electrical inducement to electrodeposition that is sufficient to overcome the resistance of the design film. The transparent coating may consist of the same resinous film-forming material used to provide the colored design with pigments eliminated, changed and/or greatly reduced in concentration.

In one embodiment, parallel stripes of paint are electrodeposited upon the workpiece and the resultant surface of irregular height is coated with a transparent or substantially transparent paint.

In another embodiment, paint of a first color and paint of a second color are electrodeposited upon the workpiece as alternate parallel strips and the design is overcoated with a pigmented transparent paint.

In another embodiment, a plurality of spots of different color paints are electrodeposited upon the workpiece in predetermined pattern and the surface is overcoated with a transparent paint.

BRIEF DESCRIPTION OF THE DRAWINGS

FIGURE 9 is a flow plan of the steps employed in carrying out certain embodiments of the method of this invention.

DESCRIPTION OF THE PREFERRED EMBODIMENTS

Figure 1:
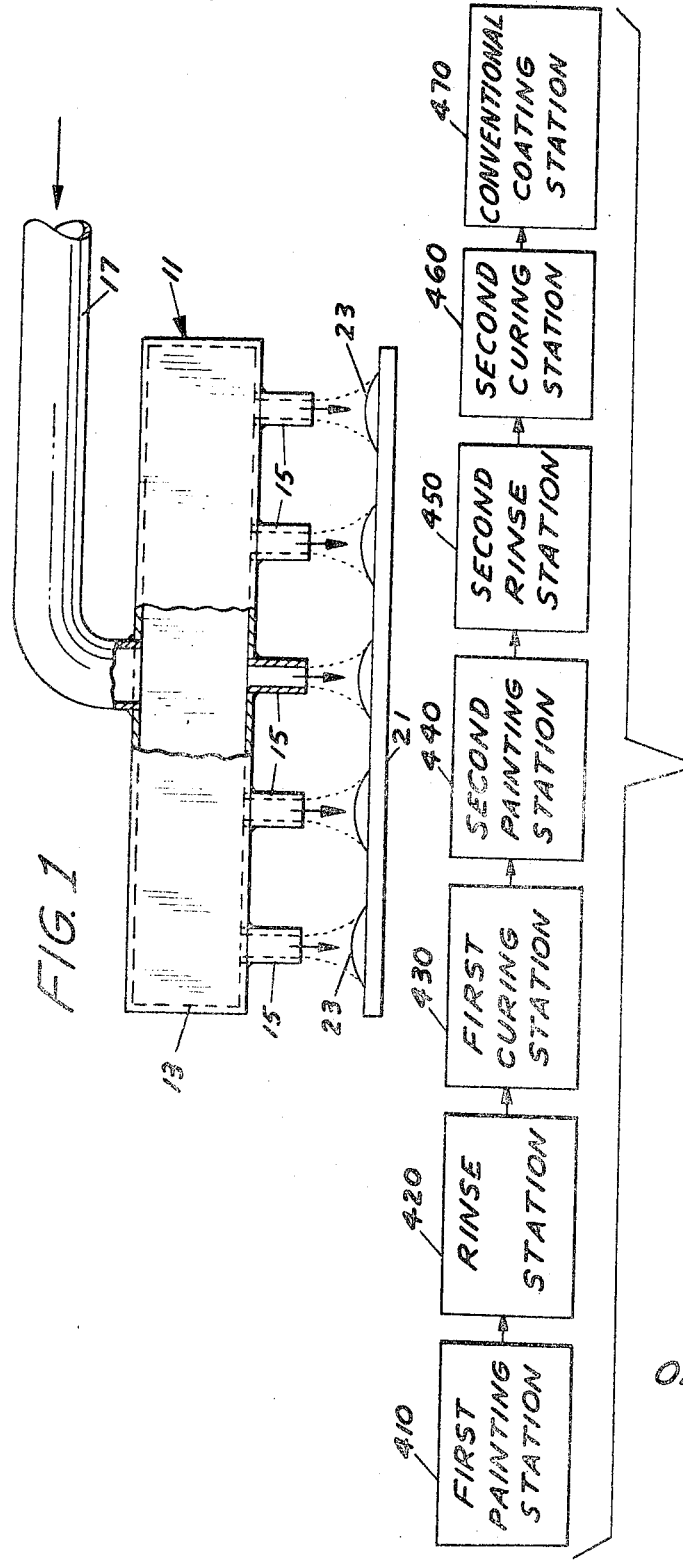
FIGURE 1 is a schematic view of one embodiment of apparatus which can be used in carrying out the method of this invention, a partially cut-away view of a cathode assembly shown discharging coating material upon a positively charged workpiece.

In FIGURE 1 there is shown a cathode assembly 11 comprising a distribution or header 13 and a plurality of outlet conduits 15. Header 13 is supplied with an aqueous dispersion of coating material via conduit 17. Cathode assembly 11, more specifically conduits 15, are in electrical connection with a negative terminal of a D.C. electrical power source, not shown. Cathode assembly 11 is positioned immediately above a sheet metal panel 21 which is in electrical connection with a positive terminal of said D.C. power source. Streams of the aforementioned coating dispersion are discharged onto panel 21 via conduits 15.

Panel 21 is movable under outlet conduits 15 in a direction perpendicular to the longitudinal axis of header 13 and in a manner such that the streams issuing from conduits 15 trace parallel lines upon panel 21. It is, of course, possible to have panel 21 remain stationary and move cathode assembly 11. However, in most instances, this will prove less desirable. Upon panel 21 are shown a plurality of coating strips 23 electrodeposited from the streams issuing from conduits 15. For purposes of illustration, the strips 23 are here shown in enlarged proportion with respect to the panel.

Figure 2:
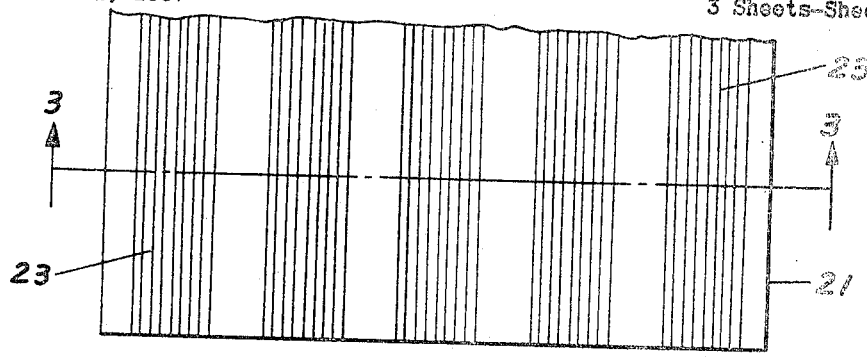
FIGURE 2 is a schematic plan view of a workpiece upon which has been electrodeposited parallel strips of a paint.
Figure 3:
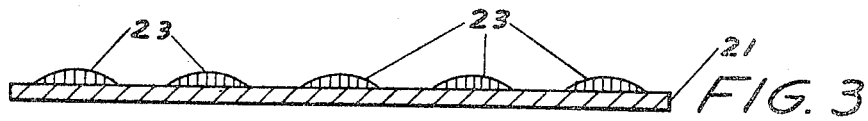
FIGURE 3 is a sectional view of the coated workpiece of FIGURE 2 taken along line 3—3.

Strips 23 are shown in top view in FIGURE 2 and in sectional view in FIGURE 3. After strips 23 have been electrodeposited, panel 21 is rinsed to remove adhered paint outside the areas of electrodeposition. The electrodeposited strips are then cured, i.e. polymerized by baking, air drying, or radiation. The surfacing of panel 21 may be completed by overcoating the side of panel 21 bearing strips 23 with topcoat 25. Topcoat 25 as here shown is a transparent coating. It may be lightly applied as here shown to provide a physically irregular surface as well as a surface having a color striped appearance. In the alternative, topcoat 25 may be more heavily applied so as to provide a flat upper surface such as that shown in FIGURE 6. In this embodiment, topcoat 25 may be an evenly tinted resin or a clear resin uniformly but lightly pigmented. A topcoat of this type is sufficiently transparent to permit strips 23 to show through the topcoat and the varying depth of the tinted or lightly pigmented topcoat will result in a variance in tone even without the color provided by strips 23. Their addition, of course, increases the variations in appearance that are possible.

Figure 5:
FIGURE 5 is a sectional view of a workpiece similar to that shown in the preceding figures upon which has been electrodeposited parallel strips of paint with alternate strips thereof being of different color.

In FIGURE 5, there is shown a panel 121 upon which have been electrodeposited a first group of paint strips 123 and between strips 121 a second group of paint strips 125. Strips 125 are of a color different from that of strips 123. The electrodeposition of strips 125 is effected by passing panel 121 beneath a second cathode assembly identical to cathode assembly 11 and spaced to discharge the streams issuing therefrom along the center of the uncoated strips between paint strips 123. It will be understood that the same effect can be accomplished by passing panel 121 under cathode assembly 11 for electrodeposition of strips 123 and again after lateral adjustment for electrodeposition of strips 125, or, by laterally adjusting the cathode assembly for the second pass.

Figure 6:
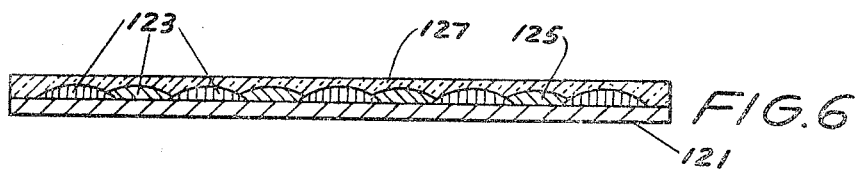
FIGURE 6 is a sectional view of the workpiece of FIGURE 5 after a topcoat of transparent paint has been applied over the electrodeposited design shown in FIGURE 5.

In FIGURE 6, the dual striped panel of FIGURE 5 is covered with a transparent clear, tinted, or lightly pigmented topcoat 127.

Figure 7:
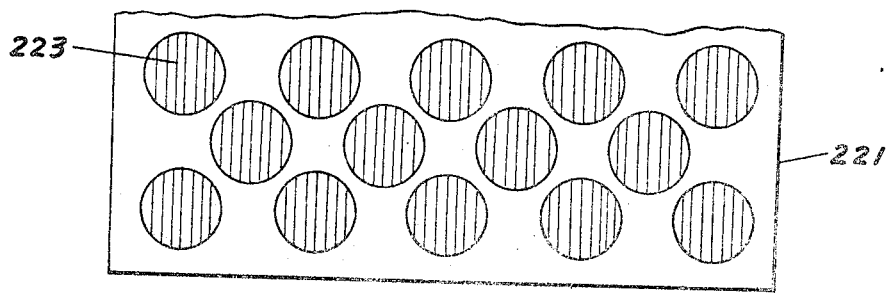
FIGURE 7 is a top view of a workpiece upon which spots of paint of a single color have been electrodeposited.
Figure 8:
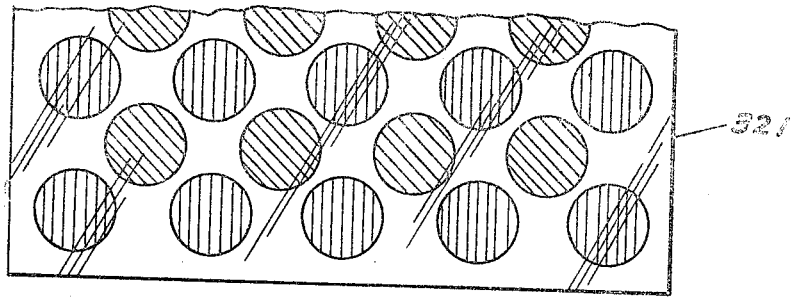
FIGURE 8 is a top view of a workpiece upon which spots of paint of two colors have been electrodeposited and the surface then overcoated with a transparent paint.

Referring now to FIGURE 7, there is shown a panel 221 upon which is electrodeposited a plurality of paint spots 223 of a predetermined size in a predetermined pattern. This design is created with the workpiece stationary. This effect can be created with a cathode assembly of essentially the same size as the panel to be coated and having an outlet means for each of the paint spots to be created. In the alternative, the design is created by having the panel and/or the cathode assembly to move in a predetermined direction for a predetermined distance between each coating step. The coated panel 321 of FIGURE 8 illustrates a further development of the spot technique of FIGURE 7 in the manner followed in the strip coating in FIGURE 6, i.e. with alternating spots of different color overcoated with a transparent clear, tinted or lightly pigmented coating.

In FIGURE 9, there is shown a flow plan for multistep coating in accordance with this invention. In this view, a first coating station 410 corresponds to the coating step described with reference to FIGURE 1. This is followed by a first rinse station 420 where a water rinse is employed to remove from the panel being coated all of the coating dispersion remaining on the panel from station 410 which has not been electrodeposited and hence is water-soluble.

Figure 4:
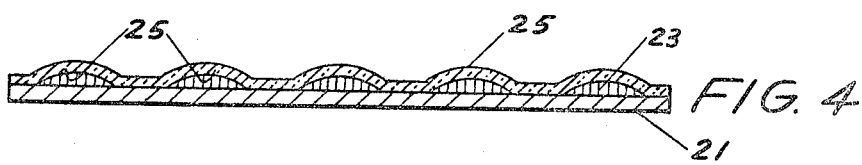
FIGURE 4 is a sectional view of the workpiece of FIGURE 3 after a topcoat of transparent paint has been applied over the electrodeposited design shown in FIGURES 2 and 3.

The workpiece then proceeds to a first curing station 430 which may be a conventional paint baking oven. After leaving the first curing station, the workpiece is passed to the second painting station 440. Station 440 may be a conventional spray coating station if the overcoat is to be applied at this time as in the preparation of the panel shown in FIGURE 4. Station 440 ordinarily will be a second electrodeposition station utilized for example to electrodeposit paint strips 125 in FIGURE 5. When painting station 440 is utilized for electrodeposition, the workpiece then passes to a second rinse station 450. The workpiece may pass directly from the second painting station 440 or from the second rinse station 450 to a second curing station 460. A third coating station 470 may follow the second curing station 460 to apply, as for example, coating 127 in FIGURE 6. It will be understood that coating station 470 may also be used for electrodeposition coating and that it may be followed by additional curing, rinse, and/or coating stations as the coating design dictates.

In the illustrated embodiments, the aqueous coating dispersion is prepared in the following manner:

An extended coupled glyceride drying oil paint binder is made by reacting in an agitator tank 8,467 parts of alkali-refined linseed oil and 2,025 parts of maleic anhydride (heated together at 232.2° C. for about three hours until an acid value of 80–90 results), then cooling this intermediate to 157.2° C., adding 1,789 parts of vinyl toluene containing 48 parts of ditertiary butyl peroxide and reacting at 218.3° C. for about an hour. The resulting vinyl toluenated material is then cooled to 157.2° C. and 5,294 parts of non-heat reactive, thermoplastic, oil-soluble phenolic resin is added, the temperature raised to 232.2° C. and the mixture held one hour. The phenolic resin is a solid lump resin having softening point of 120–150° C., specific gravity of 1.03–1.05 at 20° C., and has been stripped to get out excess phenol and low molecular weight materials. It is a condensation product of about equimolar quantities of para tertiary butyl phenol and formaldehyde. The electrical equivalent weight of the resulting acid resin as extended is about 1,640, and it has acid number of 65.

The material then is cooled to 93.3° C., and 1,140 parts are taken for forming a paint dispersion. To these 1,140 parts, 100 parts of water are added, then 13.6 parts of triethylamine, the mixture agitated for a few minutes, then 74 more parts of water and 92.5 parts diisopropanol amine added. This mixture is further reduced with 1,825 parts water and 32.5 parts diethylene triamine while agitation is continued.

To this paint dispersion there is added 50 parts of a treating mixture of mineral spirits, a light hydrocarbon liquid having A.P.I. gravity of 45–49.5, specific gravity at 15.6° C. of 0.78–0.80, flash point (Cleveland Open Cup) between 37.8–46° C., a negative doctor test and no acidity, 12 parts of a wetting agent (the oleic ester of sarcosine, having a maximum of 2% free fatty acid, a specific gravity of 0.948, color on the Gardner scale of 6, and a molecular weight of 340–350). This material is compatible with the paint dispersion; no distinct hydrocarbon phase results either at this time, even though a substantial amount of hydrocarbon (predominantly aliphatic) has been used, nor after further addition of the pigment grind and addition of extra water to make the initial painting bath.

A pigment grind is made from 123 parts of vinyl toluenated, maleic-coupled linseed oil made in the same manner as the resin hereinbefore shown in this example (except that the resulting polycarboxylic acid resin is not extended with the phenolic resin), 8.4 parts of diisopropanol amine, 0.7 part of an antifoam agent (a ditertiary acetylenic glycol with methyl and isopropyl substitution on the tertiary carbon atoms), 233 parts of fine kaolin clay, 155 parts of pigmentary titanium dioxide, 7.8 parts of fine lead chromate, 15.5 parts of fine red iron oxide, 16.9 parts of carbon black, and 201 parts of water. The resulting pigment grind is then blended with the foregoing paint dispersion and treating mixture to make a concentrated paint. The resulting paint is reduced further with water in the ratio of one part of the resulting paint per 5 parts of water to make an initial painting bath for electropainting operations. The resulting bath has resin solids (non-volatile matter) concentration of 7.24%. The total of amine equivalents used in making up the initial bath is about 4.5 times the minimum amount necessary to keep this polycarboxylic acid resin, once dispersed, in anionic polyelectrolyte condition in the bath and about 1.25 times full neutralization of the acid resin with respect to its acid number. The number of coulombs of direct current used to electroplate a gram of this resin on an anode at minimum amine concentration in the bath to develop requisite polyelectrolyte characteristics for my coating process is virtually constant at 24. Specific resistance of the initial bath is about 900 ohm-centimeters.

The replacement paint solids are made by dispersing 1,140 parts of the same kind of extended polycarboxylic acid resin with 100 parts of water and 13.6 parts of triethylamine. To this is added the mineral spirits, the wetting agent, and the foregoing pigment grind, all of the same compositions and in proportions as are used to make up the original paint dispersion for the bath.

Broken lines are employed in FIGURE 1 to indicate generally liquid flow from cathode to anode. In the preferred embodiment, the cathode is spaced from the anode a distance of less than about 10 inches, advantageously not greater than about 4 inches, and preferably not greater than about 2 inches. The difference of electrical potential between cathode and anode is advantageously in the range of about 400 to about 1,000 volts. Bath resistivity is ordinarily in the range of about 500 to about 1,000 ohm-cm. In the illustrated embodiment, the spacing is about 2 inches, the difference of potential is about 400 volts, and the individual streams issuing from conduits 15 are about ¼ inch in diameter prior to merging. Electrodeposited films are cured by baking at 360° F., air temperature, for 25 minutes.

In this application, "painting" by electrodeposition is meant to include the deposition of finely ground pigment and/or filler in the ionizable resin herein referred to as the binder, the deposition of binder without pigment and/or filler or having very little of same, but which can be tinted if desired, and the deposition of other water reducible surface coating compositions containing the binder which might be considered to be broadly analogous to enamel, varnish, or lacquer bases, and the coating material for such deposition is termed a "paint." Thus, the binder, which is converted to a water-resistant film by the electrodeposition and ultimately converted to a durable film resistant to conventional service conditions by final curing, can be all or virtually all that is to be deposited to form the film, or it can be a vehicle for pigmentary and/or mineral filler material or even other resins on which it exerts the desired action for depositing the film. Suitable resins include but are not limited to those specifically listed in U.S. Patent 3,230,162 to A. E. Gilchrist. The preferred resins for anodic deposition have an acid number between about 30 and about 300 and an electrical equivalent weight between about 1,000 and about 20,000. The term "electrical equivalent weight" is employed herein to mean that amount of resin or resin mixture that will deposit per Faraday of electrical energy input. The conditions, procedures, and calculations which can be employed to determine electrical equivalent weight are set forth in detail in the aforementioned U.S. Patent 3,230,162.

It will be understood by those skilled in the art that the design of the cathode assembly may be varied in accordance with design requirements within the operational requirements of the electrodeposition process.

The thickness of the film obtained in the electroflocoating step or steps can be controlled by controlling the time the workpiece is within the stream, the difference of potential between the electrodes, the cross sectional area of the coating stream, and the distance between electrodes while electrodeposition is being carried out.

While the coating materials heretofore described herein and the films electrodeposited therefrom are conventionally cured by conventional curing techniques such as baking, it will be understood that it is within the scope of this invention to electrodeposit coating compositions which are also adapted for radiation polymerization, e.g. by an electron beam having an average potential in the range of about 150,000 to about 450,000 electron volts. Such resins, in addition to the ionizable carboxylic acid groups of the resins heretofore described, have about 0.5 to about 3 alpha-beta olefinic unsaturation units per 1,000 units molecular weight. Examples of such resins and methods for their preparation are described in the copending United States patent application Ser. No. 583,885, filed Oct. 3, 1966, by Arthur G. Smith and Allen H. Turner and now abandoned.

The disclosures of the aforementioned patent to Gilchrist, U.S. Patent 3,230,162, shall be deemed to be incorporated within this specification by reference.

The method of this invention finds particular utility in the production of ornamental wall panels, structural metal components, etc.

The foregoing examples are solely for purposes of illustration and should not be considered as limitations upon the true scope of the invention as set forth in the appended claims.

I claim:

1. The method of forming a decorative coating upon an electrically conductive workpiece which comprises directing a stream of an aqueous dispersion of polymerizable organic, film-forming, coating material upon, a predetermined surface portion of said workpiece from an electrode spaced from said workpiece, maintaining a difference of electrical potential between said electrode and said workpiece causing a direct current of electrical energy to pass through said stream between said electrode and said workpiece effecting electrodeposition of an essentially, water insoluble coating of said coating material upon said predetermined portion of the surface of said workpiece in a predetermined design, applying a substantially transparent coating of a polymerizable organic film-forming material to the surface of said workpiece bearing the electrodeposited design coating which covers said design coating, and subjecting the workpiece to paint polymerization conditions which provide said workpiece with a substantially transparent, polymerized coating over said design coating.

2. The method of claim 1 wherein said organic, film-forming, coating material is a polycarboxylic acid resin.

3. The method of claim 1 wherein the area of said predetermined portion is controlled by mechanically limiting the cross sectional area and configuration of said stream by passing said stream through an opening in said electrode having a size and shape adapted to limit the cross sectional area and configuration of said stream, and electrically limiting the electrodeposition area within the contact area of said stream upon said workpiece by limiting the distance said stream travels between said electrode and said workpiece to a distance of less than about 10 inches and limiting the difference of electrical potential between said electrode and said workpiece to a difference of electrical potential that will effect electrodeposition of said coating material upon said workpiece within a predetermined portion of the contact area of said stream upon said workpiece.

4. The method of claim 1 wherein said difference of electrical potential is in the range of about 400 to about 1,000 volts, the electrical resistivity of said stream is in the range of about 500 to about 1,000 ohm-cm., and the length of said stream between said electrode and said workpiece is less than about 10 inches.

5. The method of claim 1 wherein said difference of electrical potential is in the range of about 400 to about 1,000 volts, the electrical resistivity of said stream is in the range of about 500 to about 1,000 ohm-cm, the length of said stream between said electrode and said workpiece is less than about 4 inches and the average cross sectional area of said stream is at least about ¼ inch.

6. The method of claim 1 wherein the substantially transparent coating material is applied to the surface of said workpiece bearing the electrodeposited design coating until the surface depressions formed by and intermediate to the electrodeposited design coating are filled therewith and the irregular surface created by electrodeposition of said design coating is converted to an essentially flat surface.

7. The method of painting a decorative coating upon an electrically conductive workpiece which comprises directing a stream of a first aqueous dispersion of pigmented, polymerizable organic, film-forming, coating material of first color upon a predetermined surface portion of said workpiece from an electrode spaced from said workpiece, maintaining a difference of electrical potential between said electrode and said workpiece causing a direct current of electrical energy to pass through said stream between said electrode and said workpiece effecting electrodeposition of an essentially, water-insoluble first coating of said coating material upon said predetermined portion of the surface of said workpiece in a predetermined design, washing adhere water-dispersible portions of said first aqueous dispersion from said workpiece, polymerizing said first coating upon said workpiece, electrodepositing upon said workpiece adjacent to said polymerized first coating an essentially, water-insoluble coating of pigmented, polymerizable organic, film-forming, coating material of second color from a second aqueous dispersion of coating material at an impressed electrical potential and current density insufficient to effect electrodeposition of said coating material of second color over a major portion of said polymerized coating, washing adhered water-dispersible portions of said second aqueous dispersion from said workpiece, polymerizing said second coating upon said workpiece, applying a substantially transparent coating of a polymerizable organic film-forming material to the surface of said workpiece bearing said first coating and said second coating, and subjecting the workpiece to paint polymerization conditions until said workpiece is provided with a substantially transparent, polymerized coating over said first coating and said second coating.

8. The method of claim 7 wherein said second coating is applied with said workpiece immersed in said second aqueous dispersion.

9. The method of claim 7 wherein said second coating is applied by directing a stream of said second aqueous dispersion upon said workpiece from an electrode spaced from said workpiece and maintaining a difference of electrical potential between said electrode and said workpiece causing a direct current of electrical energy to pass through said stream between said electrode and said workpiece.

10. The method of claim 7 wherein said first dispersion is an aqueous dispersion of a water soluble amine and a paint having as the predominant fraction of the film-forming binder thereof a synthetic, polycarboxylic acid resin.

11. The method of claim 7 wherein said second dispersion is an aqueous dispersion of a water soluble amine and a paint having as the predominant fraction of the film-forming binder thereof a synthetic, polycarboxylic acid resin.

12. An article of manufacture comprising a metal substrate and a decorative coating thereon formed by the method of claim 1.

13. An article of manufacture comprising a metal substrate and a decorative coating thereon formed by the method of claim 7.

References Cited

UNITED STATES PATENTS

| | | | |
|---|---|---|---|
| 2,251,992 | 8/1941 | Flory et al. | 204—181 |
| 2,906,682 | 9/1959 | Fahnoe et al. | 204—181 |
| 3,360,450 | 12/1967 | Hays | 204—181 |
| 3,399,126 | 8/1968 | Turner | 204—181 |
| 3,402,111 | 9/1968 | Ville | 204—181 |

JOHN H. MACK, Primary Examiner

E. ZAGARELLA, Jr., Assistant Examiner